Nov. 24, 1936.  J. C. HINTZ  2,061,799
MEAT TENDERER
Filed Jan. 19, 1935  4 Sheets-Sheet 2
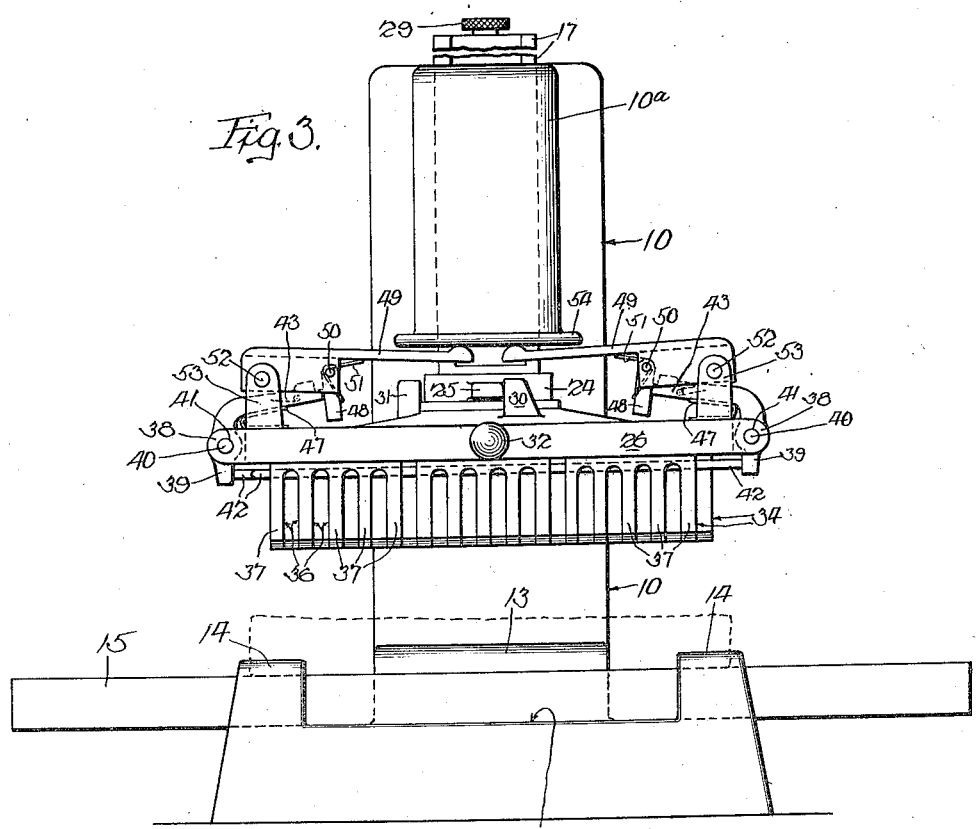
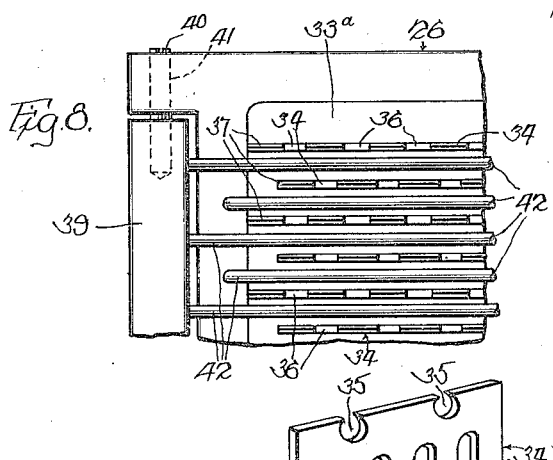
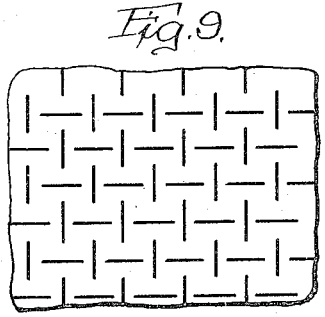
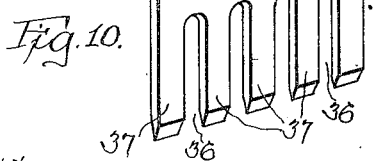
Inventor:
John C. Hintz

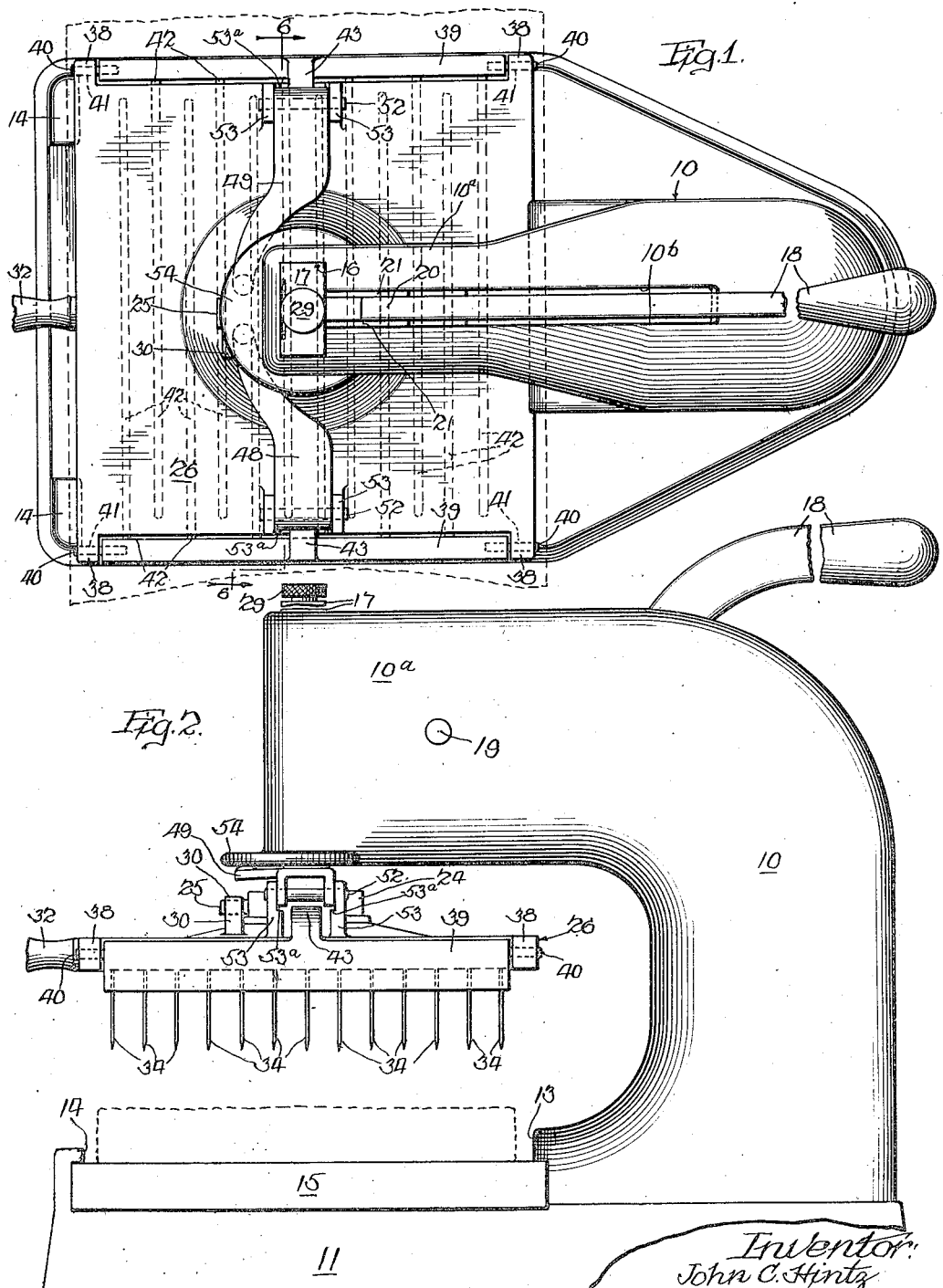

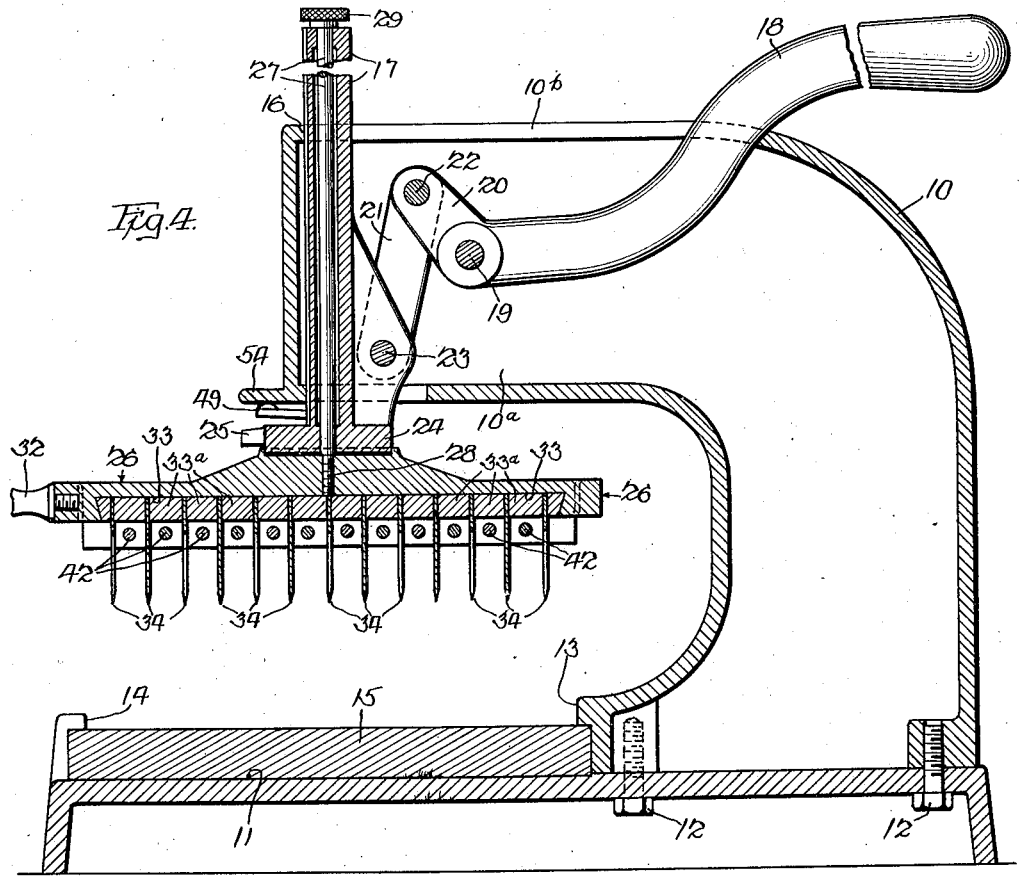
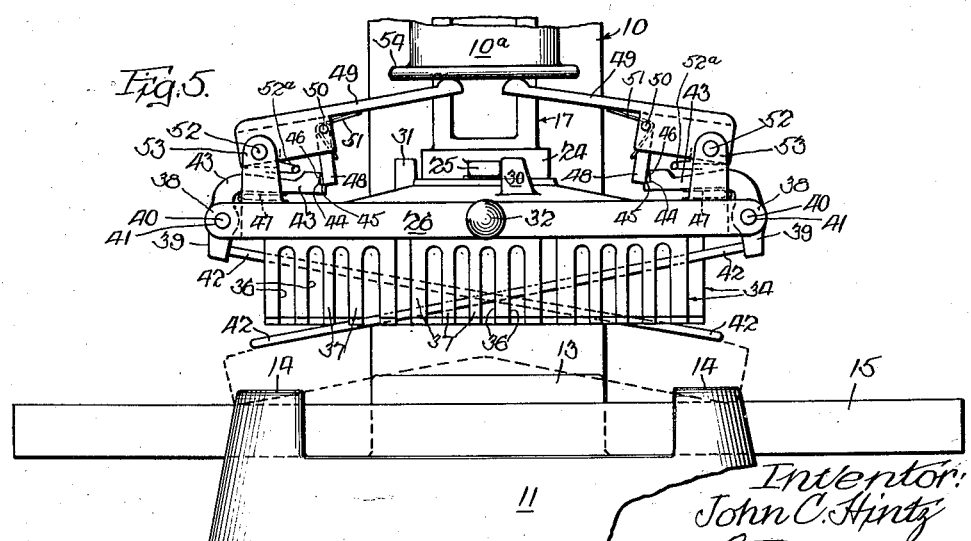

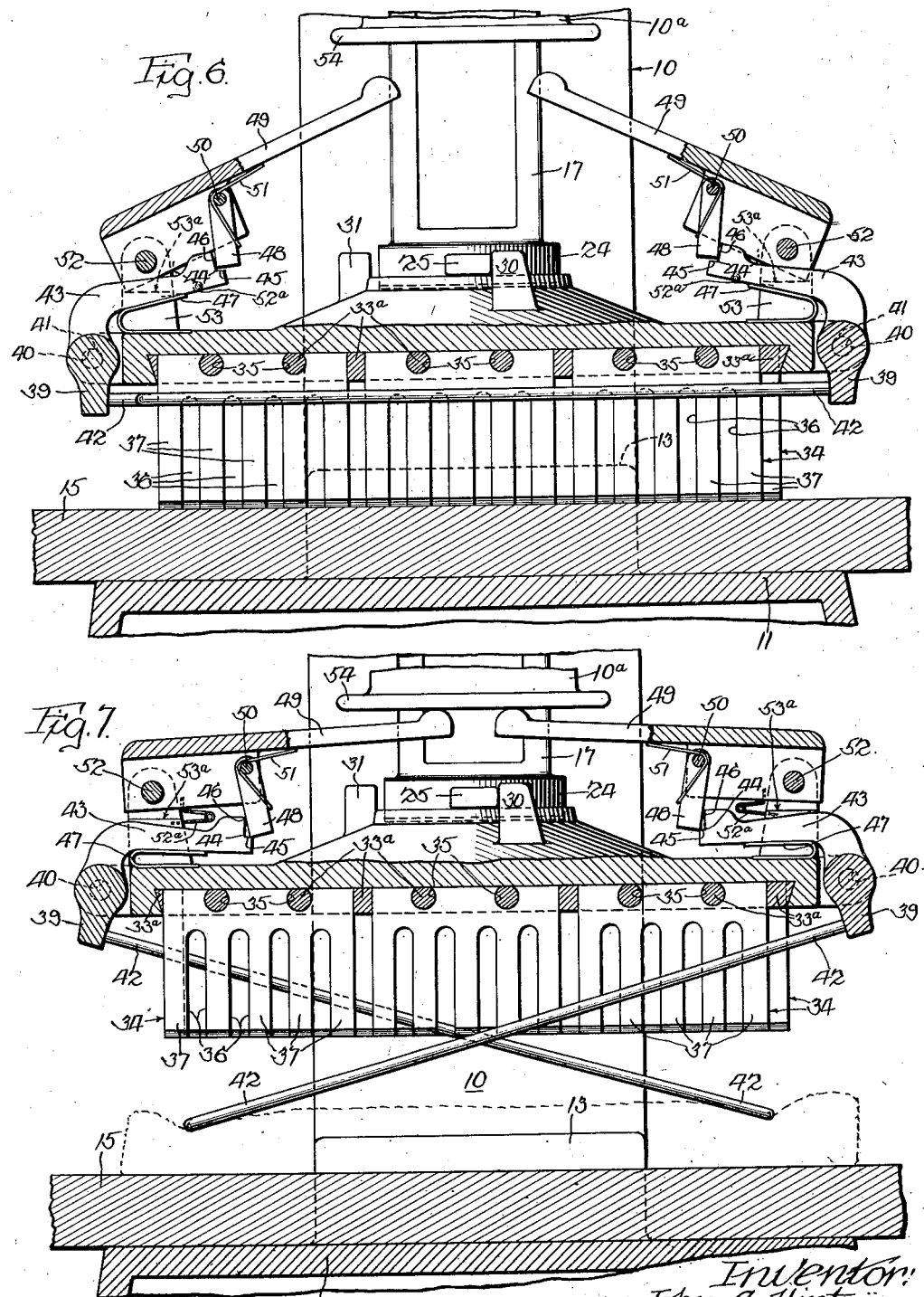

Patented Nov. 24, 1936

2,061,799

UNITED STATES PATENT OFFICE 2,061,799

MEAT TENDERER

John C. Hintz, River Forest, Ill., assignor to Tenderet Corporation, Chicago, Ill., a corporation of Illinois Application January 19, 1935, Serial No. 2,481

14 Claims. (Cl. 17—25)

This invention relates to a meat tendering machine and more particularly to a machine for making a multiplicity of cuts in meats such as steaks, chops, etc., for the purpose of making the same more edible and easily masticated.

The chief object of the invention is the provision of a machine for tendering meat in which a plurality of cutting knives are employed for making a multiplicity of cuts in meat at various angles to the original cuts made therein.

A further object is the provision of a novel stripper means employed in connection with a movable knife-carrier whereby the meat will be easily and positively stripped from the knife blades in advance of making further cuts into the meat and prior to revolving the knife-carrier for making cuts at an angle to the cuts originally made.

A still further object is the provision of a novel engaging and tripping means associated with the stripper means for engaging and positively rocking the same to strip the meat and to be automatically disengaged therefrom during one direction of movement of the knife-carrier.

Referring to the drawings:—

Figure 1 is a top plan view of a machine constructed in accordance with this invention.

Figure 2 is a side elevation of the machine.

Figure 3 is a front elevation of the same.

Figure 4 is a medial longitudinal sectional view of the machine.

Figure 5 is a fragmentary detail front elevation of the machine illustrating the knife-carrier and the stripper means being actuated to strip the meat from the cutting knives.

Figure 6 is a detail cross-sectional view taken substantially on the line 6—6 of Fig. 1 illustrating the ram and knife-carrier in lowered position.

Figure 7 is a cross-sectional view similar to Fig. 6 illustrating the ram and knife-carrier near the limit of their raised position at which point the trigger-fingers are about to be disengaged from the arms that actuate the stripper means.

Figure 8 is a fragmentary bottom plan view of the cutting knives on the knife-carrier.

Figure 9 is a partial detail view of a piece of meat to illustrate the position of the cuts made therein as the cutter-head is rotated 90° to the original cut; and Figure 10 is a detail perspective view of one of the cutting knives.

The machine comprises a frame 10 which has a base 11 that may be an integral part thereof, but as shown, is secured to the frame 10 by means of the screws 12. The frame 10 is provided with an inwardly directed lug 13 and the base is also provided with inwardly directed lugs 14 under which a relatively long board 15 is slidably positioned on the base 11 and serves to support the meat while the same is in position on the machine.

The frame 10 has an extension 10a that overhangs the base 11 and is provided with a vertical opening 16 to receive and guide a ram or plunger 17 therein which is controlled for vertical sliding movements by means of a handle 18 which extends into the frame through an elongated slot opening 10b. The handle 18 is pivotally carried on a stud 19 in the frame 10 and has an integral extending portion 20 which projects beyond the pivotal center 19 and has the connecting links 21 pivotally carried at the free end thereof by means of the pin 22 and the free ends of these links 21 are pivotally attached to the ram or plunger 17 by means of a pin 23. The links 21 and the extension 20 of the handle 18 form a toggle connection for the ram or plunger 17 and provide for a relatively easy movement of the ram or plunger 17 as the handle 18 is rocked forwardly on the stud 19.

The ram or plunger 17 is preferably rectangular in cross-section and is guided in the rectangular opening 16 in the frame 10 which serves to retain the same from turning movements therein but permits of a relatively smooth and easy vertical movement of the ram. The lower portion of the ram 17 is provided with an annular flange 24 which has an integral lug 25 extending outwardly therefrom to serve as a stop for a knife-carrier 26 that is carried for swinging movements on the lower end of the ram 17. The knife-carrier 26 is adapted to be readily attached to and detached from the ram 17 by means of a relatively long screw-member 27 which is provided with a reduced threaded portion 28 at its lower end and with a knurled head 29 at its other end. The screw member 27 is adapted to extend the length of the plunger 17 with the head 29 thereof engaging the top surface of the plunger and the threaded end 28 being threaded into the knife-carrier 26. The knife-carrier 26 is provided with a pair of upwardly extending studs 30 and 31 which are arranged to engage both sides of the integral lug 25 on the portion 24 of the plunger 17 as the knife-carrier 26 is turned and serves to limit its movement for a 90° turn while being suspended on the ram 17 by means of the head 29 of the screw member 27.

The knife-carrier 26 is provided on its front end portion with a handle 32 which forms a hand-grip for manually turning the knife-carrier to the desired position. The knife-carrier 26 is recessed on its bottom surface to form an opening 33 therein into which a plurality of cutting knives 34 are positioned in spaced relation with each other and are securely retained therein by pouring lead or white metal 33a or the like in a melted form and which when cooled, will entirely fill this recess 33 and securely retain the cutting knives 34 in fixed position on the knife-carrier 26.

The cutting knives 34 are preferably of relatively short sections requiring a given number of them to be placed end to end to extend the length of the knife-carrier and each section is provided with a three-quarter round cut-away portion 35 on its top surface through which the melted metal may flow to securely retain these knives in position on the knife-carrier. The cutting or penetrating edge of the knife is discontinuous, being provided with a plurality of cut-out portions 36 which provide a plurality of depending tongues 37 which are sharpened and which form the penetrating edge of the cutting knives 34.

The knife-carrier 26 is preferably rectangular as viewed in top view Figure 1, and is provided with a pair of outwardly extending ears 38 on opposite side edges which serve to carry a horizontally disposed rocker member 39 between each pair of ears 38. The rocker members 39 are pivotally carried on each pair of ears 38 by means of the pins 40 which are fixed into the rocker member 39 and extend through openings 41 in the ears 38. Each of the rocker members 39 depends below the knife-carrier a relatively short distance and serves to support a plurality of rods 42 which are secured in any suitable manner to the rocker members and which when positioned on the knife-carrier are directed toward each other in staggered relation, being threaded in the spaces between the cutting knives. These rods 42 are normally retained parallel with and in spaced relation with the under surface of the knife-carrier but in close proximity therewith, permitting the full penetration of the cutting knives into the meat to be treated before engaging these rods 42.

Each of the rocker members 39 is provided with an upwardly and inwardly directed arm 43 which is positioned about centrally thereof and is provided with a notched-out portion or step 44 on its free end portion which forms a platform 45 and a shoulder 46. Interposed between each of the arms 43 and the top of the knife-carrier 26 is a U-shaped spring 47 which normally exerts a pressure upwardly for retaining the rocker member 39 and the rod 42 in their raised normal positions. Each of the platforms 45 of the arms 43 is adapted to be engaged by means of a trigger-finger 48 which is pivotally carried on one of a pair of arms 49 by means of a pin 50 and is yieldingly retained for movement in one direction thereon by means of a torsion spring 51. The arms 49 are pivotally carried on the knife-carrier 26 by means of the pins 52 extending therethrough and into a pair of ears 53 adjacent each side edge of the knife-carrier. Each of the arms 49 is normally urged upwardly by means of a torsion spring 52a which has one end engaging the arm 49 and with its other end engaging the ear 53. Each of the ears 53 is provided with a shoulder 53a on its inner side which serves to limit the upward swinging movement of the arms 49. These arms 49 are directed toward each other and normally extend under an annular flange 54 formed integrally on the extension 10a of the frame 10.

As thus far described, the meat to be treated is placed upon the board 15, which is then placed on the base 11 and slid into position between the lugs 13 and 14 until the meat is directly below the knife-carrier. The operator then pulls the handle 18 forwardly, which causes the toggle connection formed by the extension 20 of the handle and the links 21 to force the ram or plunger 17 downwardly and carry the knife-carrier 26 therewith with the cutting knives 34 thereon to penetrate and cut the meat with a straight downward pressure thereon. The handle is then rocked rearwardly to its normal position and the ram 17, the knife-carrier 26 and the cutting knives 34 are then drawn upwardly, which tends to carry the meat therewith by reason of its adhering qualities to the plurality of tongues 37 of the knives 34. During the downward or penetrating movement of the cutting knives with the knife-carrier, the arms 49 are carried therewith away from the flange 54 and the springs 52a will cause these arms 49 to be rocked upwardly on the pins 52 and carry the trigger-fingers 48 therewith until their free lower ends have passed the notched-out portions 44 of the arms 43 of the rocker members 39 and by reason of the torsion springs 51 engaging these trigger fingers 48, will cause them to be urged against the shoulders 46 of the arms 43 with their lower end portions over the platform 45 of the arms 43. After the knife-carrier 26 has been moved upwardly for a given distance, the free ends of the arms 49 will be brought into engagement with the flange 54 which will cause a downward rocking movement of these arms 49 on the pins 52 and carry the trigger-finger 48 therewith to engage the platform 45 and cause a downward rocking movement of the arms 43 with the rocker member 39, which will carry the rods 42 for a downward rocking movement therewith (Fig. 5), so that the free ends of these rods 42 will engage the opposite edges of the meat that is being treated and force the same downwardly to assume a substantially curved position. Upon a further upward movement of the knife-carrier 26, the rods 42 will be rocked a greater distance downwardly until they have caused the meat to be carried completely away from the knives (Fig. 7). Just at this point of movement of the knife-carrier 26, the arms 49 will have been rocked downwardly and cause the arms 43 of the rocker members 39 to be rocked therewith by means of the trigger-fingers 48 and the rocking movement of these arms 43 will cause the shoulders 46 thereon to engage the inner surfaces of the trigger fingers 48 and gradually force the same off of the platforms 45, thereby releasing their engagement with these arms 43 and permit them to be returned to their normal positions by means of the U-shaped springs 47 (Fig. 3).

While the knife-carrier is in its raised position, the operator may manually swing the same to a 90° angle to that shown in Figures 1 and 3, and the operation may be repeated for causing the knives to penetrate the meat at a right-angle to the previous penetration made therein while the knives were in their normal position and before the head was turned 90°. This turning movement of the head permits of the knives to penetrate the meat in the manner shown in Figure 9, which cuts the tendons, ligaments, etc., of the meat in different directions, and in a manner so as to have the cuts discontinuous. This operation of penetrating the meat may be repeated as often as desired, and in each instance upon the upward movement of the head composed of the knife-carrier and the means for stripping the meat from the cutting knives will be actuated to positively eject the meat from these cutting knives in such a manner so as to cause the same to curve and be forced away from these knives gradually from the outermost edge of two sides to the center. This curving of the meat to remove the same from the cutting knives is two-fold, in that it is easier to eject the meat, and secondly, when ejected and a second cut is desired while in the same position, the meat will assume a slightly different position and a new cut will be made therein.

While I have illustrated and described my invention for use in tendering meat, the same may be employed for tendering various kinds of foods which may be bodily placed below the knife-carrier and the penetrating or cutting effect will be the same as above described.

I claim:

1. In a device for tendering meat, the combination with a frame having a base, of a knife-carrier slidably mounted on the frame for movement toward and from the base, cutting knives carried in parallel spaced relation by said knife-carrier, stripper means extending between the knives and carried for rocking movements on said knife-carrier, and means coacting with said stripper means for rocking the same upon one direction of movement of the knife-carrier.

2. In a device for tendering meat, the combination with a frame member having a base, of a knife-carrier slidably mounted on the frame for movement toward and from the base, cutting knives carried by said knife-carrier, oppositely directed stripper means rockably carried on said knife-carrier, said stripper means extending between the cutting knives, and trip means coacting with the stripper means effecting a rocking movement thereof in one direction of sliding movement of the knife-carrier.

3. In a device for tendering meat, the combination with a frame member having a base, of a knife-carrier slidably mounted on the frame for movement toward and from the base, cutting knives carried in spaced relation by said knife-carrier, a stripper comprising oppositely directed fingers disposed between the cutting knives, said stripper being rockably carried for movement with the knife-carrier, and means to give the stripper a rocking movement during the return sliding movement of the knife-carrier.

4. In a device for tendering meat, the combination with a frame member having a base, of a knife-carrier slidably mounted on the frame for movement toward and from the base, cutting knives carried in spaced relation by said knife-carrier, a stripper comprising oppositely directed fingers disposed between the cutting knives, said stripper being rockably carried for movement with the knife-carrier, and means engaging the stripper in one direction of movement of the knife-carrier, said last mentioned means forming means for rocking and to automatically release the stripper upon its other direction of movement.

5. In a device for tendering meat, the combination with a frame having a base, of a knife-carrier on the frame movable toward and from the base, a plurality of cutting knives carried by said knife-carrier, each knife having a discontinuous cutting edge, stripper means carried for movement with the knife-carrier, said stripper means comprising a plurality of fingers disposed in opposed interlocked positions and carried for rocking movements on the knife-carrier, and means to give the stripper means a rocking movement and to restore the same during one direction of movement of the knife-carrier.

6. In a device for tendering meat, the combination with a frame having a base, of a slidably-mounted knife-carrier on the frame and movable toward and from the base, cutting knives carried by said knife-carrier, stripper means carried for movement with and for independent movement on the knife-carrier, and means to move and restore the strippers coincident to the sliding movement of said knife-carrier from the base, said means comprising opposed pivotally carried arms on the knife-carrier, a spring urged trigger-finger on each of the arms, engageable means on the stripper means extending into the path of movement of the trigger means and engageable thereby, and said engageable means forming means for disengaging the trigger-fingers at near the limit movement of the arms in one direction of movement of the knife-carrier.

7. In a device for tendering meat, the combination with a frame having a base, of a slidably-mounted knife-carrier on the frame and movable toward and from the base, cutting knives carried by said knife-carrier, stripper means carried for movement with and for independent movement on the knife-carrier, and means to give the stripper means a movement independently of that of the knife-carrier and in a direction at an angle to the cutting knives.

8. In a device for tendering meat, the combination with a frame having a base, of a knife-carrier slidably mounted on the frame for movement toward and from the base, cutting knives carried by said knife carrier, oppositely directed stripper means rockably carried on two side edges of said knife-carrier and having engageable extensions thereon, said stripper means extending between the cutting knives, trip means coacting with the stripper means, said trip means comprising pivotally carried arms, a trigger-finger on each of the arms, springs urging the arms and trigger-fingers upwardly, said trigger-fingers engaging the extensions on the stripper means upon a movement of the knife-carrier toward the base, said arms engaging the frame upon the other direction of movement of the knife-carrier and effecting a rocking movement of the stripper means, and means on the extensions of the stripper means causing the disengagement of the trigger-fingers therewith as the knife-carrier is moved from the base and rendering the stripper means free to be spring-urged to normal position.

9. In a device for tendering meat, the combination with a frame having a base, of a knife-carrier arranged for movement on the frame toward and from the base, downwardly directed cutting knives carried by the knife-carrier, stripper means carried for rocking movements in opposed directions on said knife-carrier, and actuating means operatively connecting the stripper means to rock the same, said actuating means normally coacting with the frame of the device whereby in one direction of movement of said knife-carrier the actuating means will engage said stripper means preparatory to causing its rocking movement and rock and release the same upon its other direction of movement while said actuating means is in engagement with the frame.

10. In a device for tendering meat, the combination with a frame having a base, of a knife-carrier arranged for movement on the frame toward and from the base, downwardly directed cutting knives carried by the knife-carrier, stripper means carried for rocking movements in opposed directions on said knife-carrier, actuating means operatively connecting the stripper means to rock the same, said actuating means being arranged to actuate and release the stripper means in one direction of movement of the knife-carrier, spring means coacting with the stripper means supporting the same in normal position and against which said actuating means operates to rock the stripper means, and means on the stripper means causing the disengagement of the actuating means therewith, said stripper means being spring-urged to normal position when free of said actuating means.

11. In a device for tendering meat, the combination with a frame having a base, of a knife-carrier arranged for movement on the frame toward and from the base, downwardly directed cutting knives carried by the knife-carrier, stripper means carried for rocking movements on said knife-carrier, said stripper means comprising oppositely directed fingers extending between the cutting knives and adapted to be rocked therebetween outwardly of the cutting edges thereof, actuating means carried on the knife-carrier, said actuating means comprising a pair of opposed arms, and a spring-pressed trigger finger on each of the arms and normally in the path of the stripper means, said stripper means being provided with inwardly directed portions each having a cut-away portion forming a platform and a shoulder thereon whereby said trigger fingers are urged over the platforms and against said shoulders during one direction of movement of the knife-carrier, and said pair of opposed arms being engaged for effecting a rocking movement thereof with said trigger fingers to rock the stripper means in the other direction of movement of the knife-carrier whereby upon a given rocking movement of said stripper means the shoulders thereof will engage the trigger fingers to cause the same to be moved free of said platforms.

12. In a device for tendering meat, comprising in combination, a frame having a base, a knife-carrier arranged for movement on the frame toward and from the base, downwardly directed cutting knives carried by the knife-carrier, stripper means carried for rocking movements on said knife-carrier, said stripper means comprising a plurality of fingers extending between alternate cutting knives and arranged for rocking movements on opposite side edges of the knife-carrier, actuating means carried on the knife-carrier for effecting a rocking movement of the stripper means, said actuating means comprising a pair of opposed arms pivotally carried on the knife-carrier, and a spring-pressed trigger finger on each of the arms and normally in the path of the stripper means, said stripper means being provided with inwardly directed portions each having a notch at one end thereof forming a platform and a shoulder thereon adapted to be engaged by said trigger fingers during one direction of movement of the knife-carrier, said pair of opposed arms being engaged for effecting a rocking movement thereof with said trigger fingers to rock the stripper means during the other direction of movement of the knife-carrier, and said shoulders providing means for releasing the trigger fingers upon a given movement of said stripper means.

13. In a device for tendering meat, the combination with a frame having a base, of a knife-carrier arranged for movement on the frame toward and from the base, cutting knives carried by said knife-carrier, stripper means directed between said cutting knives and carried for rocking movements in opposed directions on said knife-carrier, actuating means on the knife-carrier operatively connecting the stripper means to rock the same, said actuating means coacting with the frame of the device for rocking the stripper means, springs normally urging the actuating means into engagement with the stripper means whereby upon a movement of the knife-carrier toward said base the actuating means will engage said stripper means preparatory to actuating the same and upon the restoring movement of the knife-carrier the actuating means will engage the frame to rock the stripper means, and means on the stripper means causing its disengagement with the actuating means upon one direction of movement of the knife-carrier.

14. In a device for tendering meat, the combination with a frame having a base, a knife-carrier mounted for movements toward and from the base, cutting knives on said knife-carrier, stripper means carried for movement with the knife-carrier, and means on the knife-carrier adapted to engage the stripper means upon one direction of movement of the knife-carrier and to rock and disengage the same upon its other direction of movement.

JOHN C. HINTZ.